(12) United States Patent
Chen et al.

(10) Patent No.: US 11,443,535 B2
(45) Date of Patent: Sep. 13, 2022

(54) LICENSE PLATE IDENTIFICATION METHOD AND SYSTEM THEREOF

(71) Applicant: Delta Electronics, Inc., Taoyuan (TW)

(72) Inventors: Yu-Ta Chen, Taoyuan (TW); Feng-Ming Liang, Taoyuan (TW); Jing-Hong Jheng, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 17 days.

(21) Appl. No.: 16/980,747

(22) PCT Filed: Jan. 21, 2019

(86) PCT No.: PCT/CN2019/072542
§ 371 (c)(1),
(2) Date: Sep. 14, 2020

(87) PCT Pub. No.: WO2019/174405
PCT Pub. Date: Sep. 19, 2019

(65) Prior Publication Data
US 2021/0004627 A1    Jan. 7, 2021

(30) Foreign Application Priority Data
Mar. 14, 2018    (CN) .......................... 201810208466.9

(51) Int. Cl.
*G06V 20/62* (2022.01)
*G06T 7/194* (2017.01)
(Continued)

(52) U.S. Cl.
CPC ........... *G06V 20/63* (2022.01); *G06K 9/6201* (2013.01); *G06K 9/6262* (2013.01); *G06T 7/194* (2017.01);
(Continued)

(58) Field of Classification Search
CPC ......... G06V 20/63; G06V 10/40; G06T 7/194
See application file for complete search history.

(56) References Cited

U.S. PATENT DOCUMENTS 8,457,408 B2 *  6/2013  Challa ................... G06V 20/63
                                                    382/190
10,152,644 B2 * 12/2018  Ma ........................ G06V 20/62
(Continued)

FOREIGN PATENT DOCUMENTS

CN        101303803 A     11/2008
CN        104239867 A     12/2014
(Continued)

OTHER PUBLICATIONS

Machine translation of Zhou et al (CN106845487A), Google patents, Jan. 21, 2022, pp. 1-6 (Year: 2022).*
(Continued)

*Primary Examiner* — Edward Park
(74) *Attorney, Agent, or Firm* — Muncy, Geissler, Olds & Lowe, P.C.

(57) ABSTRACT

A license plate identification method is provided, including steps of: obtaining a to-be-processed image including all characters on a license plate; extracting several feature maps corresponding to character features of the to-be-processed image through a feature map extraction module; for each of the characters, extracting a block and a coordinate according to the feature maps through a character identification model based on a neural network; and obtaining a license plate identification result according to the respective blocks and the respective coordinates of the characters.

10 Claims, 15 Drawing Sheets

(51) Int. Cl.
*G06K 9/62* (2022.01)
*G06V 10/40* (2022.01)

(52) U.S. Cl.
CPC .... *G06V 10/40* (2022.01); *G06T 2207/30252* (2013.01); *G06V 20/625* (2022.01)

(56) References Cited

U.S. PATENT DOCUMENTS

| | | | |
|---|---|---|---|
| 11,224,364 B2* | 1/2022 | Jones | A61B 5/7257 |
| 2013/0266185 A1* | 10/2013 | Bulan | G06V 10/25 |
| | | | 382/104 |
| 2018/0025256 A1* | 1/2018 | Bai | G06K 9/62 |
| | | | 382/229 |
| 2021/0004627 A1* | 1/2021 | Chen | G06V 20/63 |
| 2021/0319678 A1* | 10/2021 | Pantus | G08B 13/181 |
| 2021/0350699 A1* | 11/2021 | Li | G08G 1/042 |

FOREIGN PATENT DOCUMENTS

| | | | |
|---|---|---|---|
| CN | 106096607 A | | 11/2016 |
| CN | 106407981 A | | 2/2017 |
| CN | 106845487 A | * | 6/2017 |
| CN | 106845487 A | | 6/2017 |
| CN | 106980854 A | | 7/2017 |
| CN | 107038442 A | | 8/2017 |
| CN | 107239778 A | | 10/2017 |
| CN | 107704857 A | | 2/2018 |
| CN | 107784303 A | | 3/2018 |
| CN | 106845487 B | | 4/2020 |
| JP | H-11306283 A | | 11/1999 |
| JP | 2009087087 A | | 4/2009 |
| TW | 200532586 A | | 10/2005 |

OTHER PUBLICATIONS

Kim et al., "Learning-based approach for license plate recognition," Neural Networks for Signal Processing X. Proceedings of the 2000 IEEE Signal Processing Society Workshop (Cat. No. 00TH8501), vol. 2, pp. 614-623, 2000.

Radzi et al., "Character Recognition of License Plate Number Using Convulutional Neural Network," Int'l Conference on Image Analysis and Processing, 17th Int'l Conference, Nov. 9, 2011, pp. 45-55.

Shima et al., "Extraction of Number Plate Images Based on Image Category Classification Using Deep Learning," IEEE Int'l Symposium on Robotics and Intelligent Sensors, Dec. 17-20, 2016, pp. 19-26.

Office Action dated Jul. 5, 2021 in CN Application No. 201810208466. 9, 10 pages.

Office Action dated Dec. 7, 2021 in JP Application No. 2020-548723, 5 pages.

Office Action dated Mar. 13, 2019 in TW Application No. 107108613, 13 pages.

Extended European Search Report dated Apr. 15, 2021 in EP Application No. 19768542.4, 42 pages.

* cited by examiner

LICENSE PLATE IDENTIFICATION METHOD AND SYSTEM THEREOF

FIELD OF THE INVENTION

The present invention relates in general to a license plate identification method and a license plate identification system, and in particular it relates to a license plate identification method and a license plate identification system that can recognize each character on a license plate using a neural network.

DESCRIPTION OF THE RELATED ART

License plate identification technology has been widely known to use image processing. The common technical means for obtaining license plate information using conventional license plate identification technology are license plate positioning, license plate character cutting, and license plate character identification. However, in practical applications, unrecognizable license plate features, license plate distortion, license plate deformation, light noise, and license plate breakage may occur in license plate images due to the different shooting angles or interference from light sources, time (day or night), weather (rain or shine), etc., thereby exacerbating identification accuracy. In addition, the existing license plate positioning technology usually finds the image location of the license plate based on the edge density value. If the license plate is stained, decorated, etc., the features of the edge density value may be destroyed, resulting in a significant decrease in the accuracy of the license plate positioning. Furthermore, if the obtained license plate is too skewed or deformed, it will be difficult to perform a cutting of the characters, and additional algorithms must be used to correct the license plate. The above problems illustrate how existing license plate identification technology has a low tolerance to the environment, and various additional image processing technologies must be used to increase the identification rate, but this will also reduce the speed of license plate identification. Therefore, how to provide a better license plate identification method to improve the tolerance of license plate identification to the environment and maintain high accuracy and fast identification speed is a problem that must be solved at present.

BRIEF SUMMARY OF THE INVENTION

An embodiment of the present invention provides a license plate identification method, which includes the following steps of: obtaining a to-be-processed image including all of the characters on a license plate; obtaining several feature maps including to character features of the to-be-processed image through a feature map extraction module; for each of the characters, extracting a block and a coordinate according to the feature maps through a character identification model based on a neural network; and obtaining a license plate identification result according to the respective blocks and the respective coordinates of the characters.

Another embodiment of the present invention provides a license plate identification system, which includes an image capturing unit and a processing unit. The image capturing unit is configured to capture at least one raw image. The processing unit is configured to: receive the raw image from the image capturing unit; obtain a to-be-processed image including all of characters on a license plate according to the raw image: obtain several feature maps including character features of the to-be-processed image through a feature map extraction module; for each of the characters, extract a block and a coordinate according to the feature maps through a character identification model based on a neural network; and obtain a license plate identification result according to the respective blocks and the respective coordinates of the characters.

Another embodiment of the present invention further provides a license plate identification method, which includes the following steps of: obtaining a to-be-processed image; obtaining several feature maps including target features through a feature map extraction module; obtaining at least one region including the target feature in each feature map and giving each frame of each feature map scores corresponding to the target features through a target location extraction module; classifying each frame in each feature map according to the scores through a target candidate classification module and retaining at least one region that corresponds to character features; and obtaining a license plate identification result according to the region that corresponds to the character feature through a voting/statistics module.

DESCRIPTION OF THE REFERENCE SIGNS IN DRAWINGS

100~a license plate identification system
110~a processing unit
120~a storage unit
130~an image capturing unit
140~a display unit
801~804~blocks corresponding to characters
810~a combined region of character blocks
820~an expanded license plate image
S201~S205, S901~S906~steps

DETAILED DESCRIPTION OF THE INVENTION

The other scopes applicable to the license plate identification method and the license plate identification system will be clearly and easily understood in the detailed description provided below. It must be understood that when the exemplary embodiments of the license plate identification method and the license plate identification system are presented, the following detailed description and specific embodiments are only for the purpose of description and not intended to limit the scope of the present invention.

Figure 1:
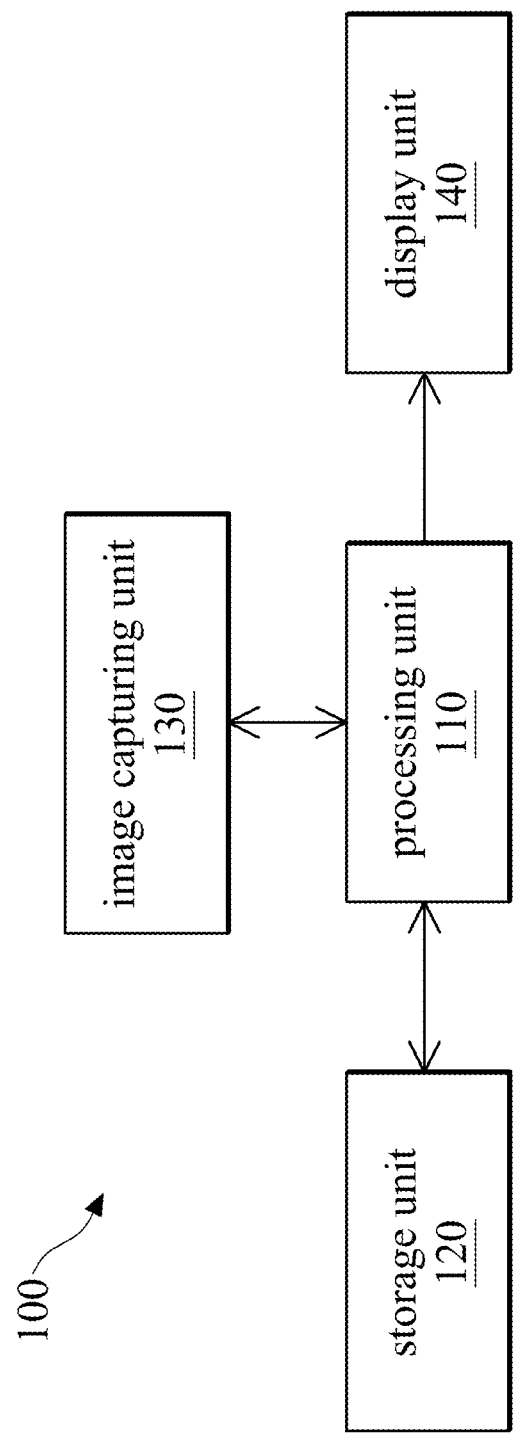
FIG. 1 is a diagram showing an architecture of a license plate identification system according to an embodiment of the invention.

FIG. 1 is a diagram showing a license plate identification system according to an embodiment of the present invention. The license plate identification system 100 can be implemented in an electronic device, such as a desktop computer, a notebook computer, or a tablet computer, and the license plate identification system 100 at least includes a processing unit 110. The processing unit 110 can be implemented in a variety of means, such as a dedicated hardware circuit or general-purpose hardware (for example, a single processor, a multi-processor with a parallel processing capability, a graphics processor, or another processor with a computing capability). When the codes or software related to each model and process of the present invention are executed, the functions described later are provided. The license plate identification system 100 further includes a storage unit 120 for storing the captured images, the data required during the execution process, and various electronic files, such as various algorithms and/or various models. The license plate identification system 100 may further include an image capturing unit 130, such as a monitor, a video camera, and/or a camera, for obtaining at least one image or continuous video images, and sending them back to the processing unit 110. The display unit 140 can be a display panel (for example, a thin-film liquid crystal display panel, an organic light-emitting diode panel, or another panel with a display capability) for displaying input characters, input numbers, input symbols, a movement track of dragging a mouse, or a user interface provided by an application program for users to watch. The license plate identification system 100 may further include an input device (not shown), such as a mouse, a stylus, or a keyboard, for the user to perform corresponding operations.

Figure 2:
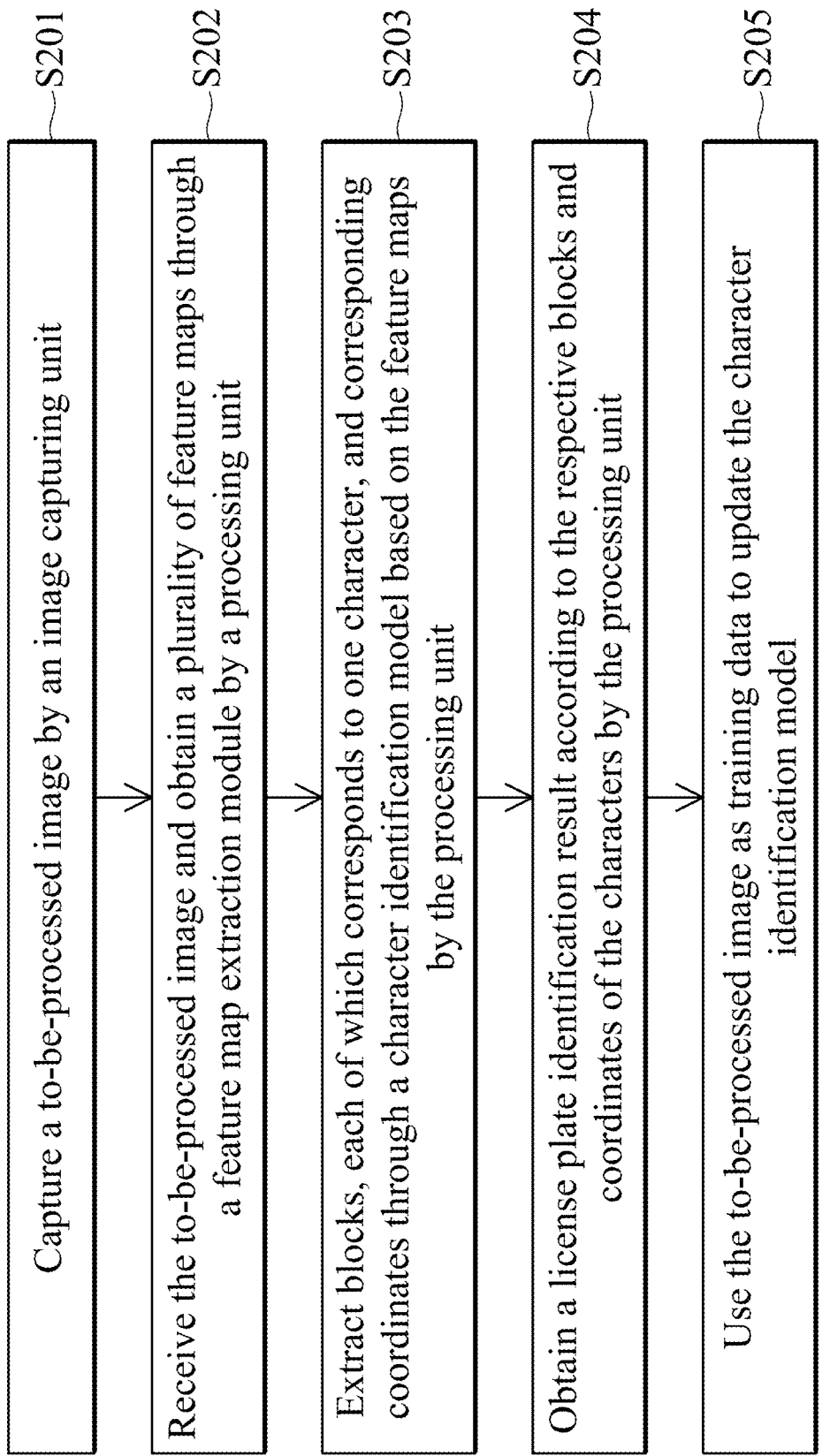
FIG. 2 is a flowchart of a license plate identification according to an embodiment of the invention.
Figure 3A:
FIG. 3A is a schematic diagram showing a current image according to an embodiment of the invention.
Figure 3B:
FIG. 3B is a schematic diagram showing an image change between a current image and a historical background image according to an embodiment of the invention.
Figure 4A:
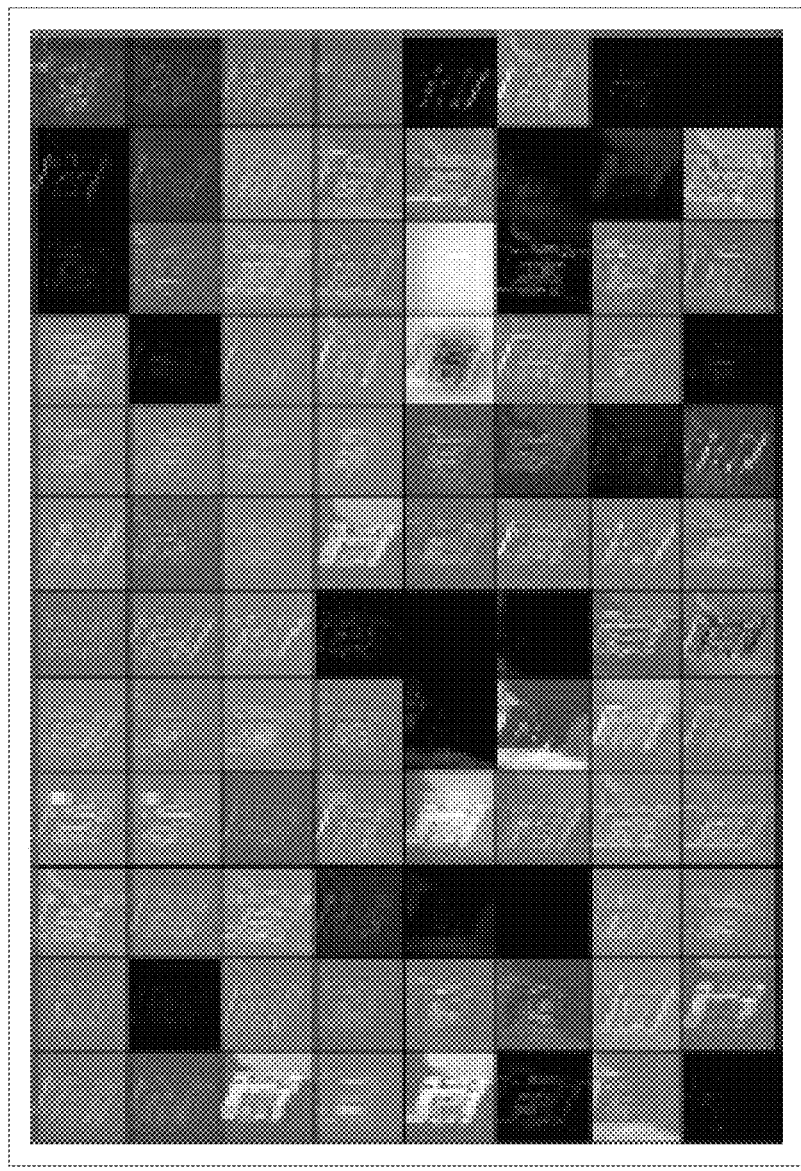
FIGS. 4A-4D are schematic diagrams showing trained matrices used to generate feature maps according to some embodiments of the invention.
Figure 4B:
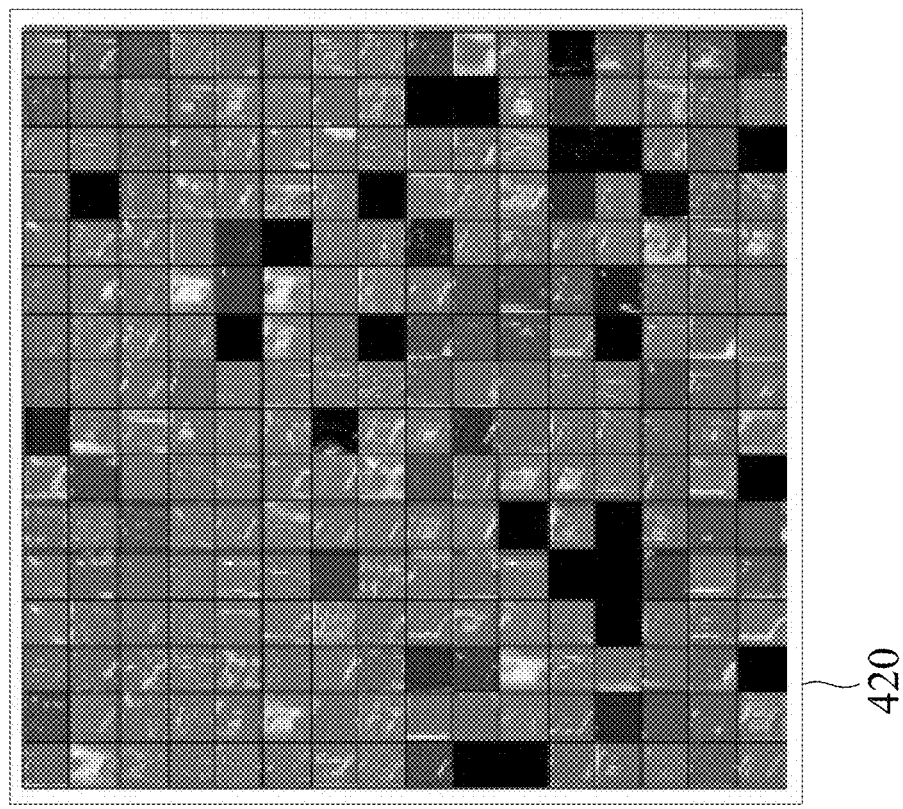
Figure 4C:
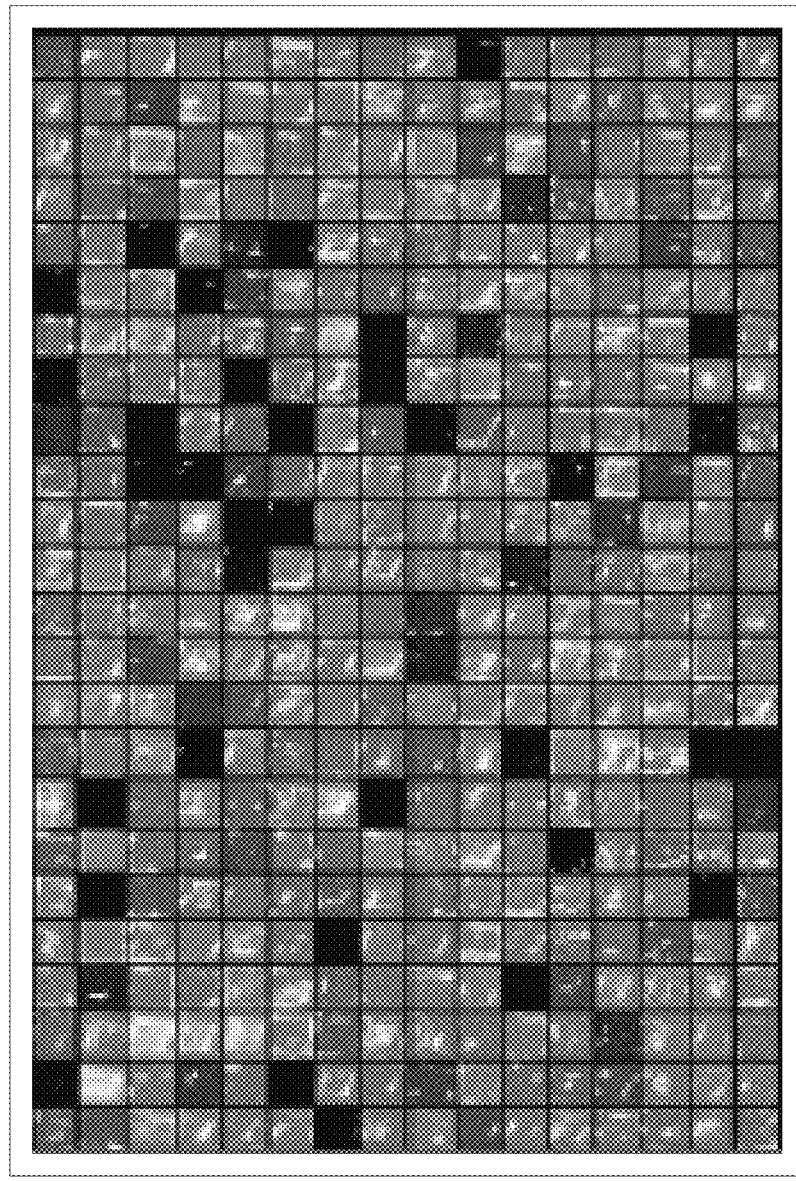
Figure 4D:
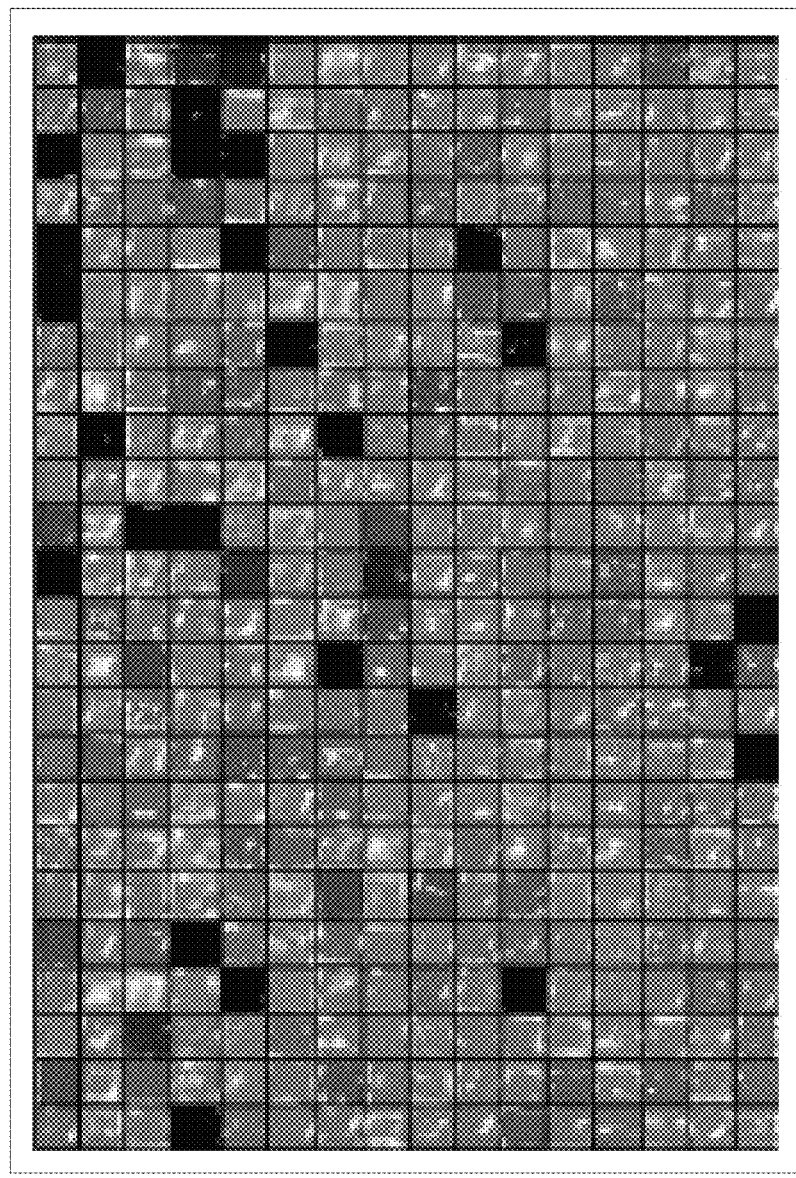

Please refer to FIG. 2, FIG. 2 shows a flow chart of a license plate identification method according to an embodiment of the invention. In Step S201, the image capturing unit 130 obtains an image which is to be processed (thereinafter, the image which is to be processed is referred to as "to-be-processed image"). In order to speed up the image processing, when the image capturing unit 130 is a monitor or a camera that can capture continuous images, the processing unit 110 can determine whether a current image shows a vehicle or another object entering a shooting range based on an operation which is performed to compare the current image with a historical image in advance. For example, the processing unit 110 may obtain a historical background image through a foreground and background subtraction module which operates according to several historical images, so that the processing unit 110 can quickly make a determination based on the historical background image and the current image. When the area of the image change or the amount of image change between the current image and the historical background image is greater than a predetermined value, the processing unit 110 determines that a vehicle or another object has entered the shooting range corresponding to the current image and then performs the following operation on the current image. For example, FIG. 3A is a diagram showing the current image, and FIG. 3B is a schematic diagram showing the image change between the current image and the historical background image. According to the content of FIG. 3B, it can be known that the area of the image change is about 37%. If the predetermined value is set to 35%, the processing unit 110 can determine that a vehicle or another object appears in the current image.

Figure 5A:
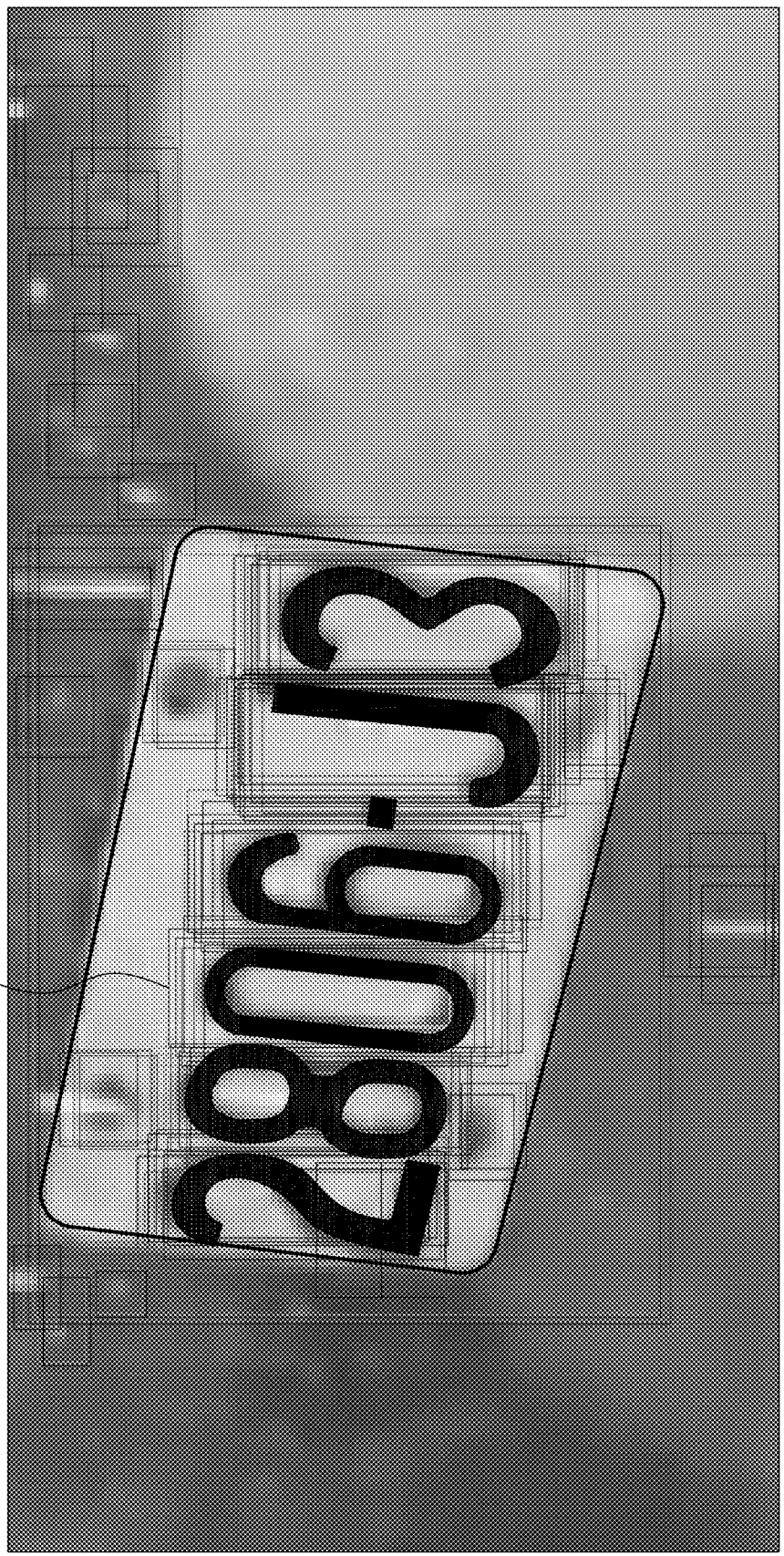
FIGS. 5A and 5B are schematic diagrams showing blocks which are determined to include characters according to an embodiment of the invention.
Figure 5B:
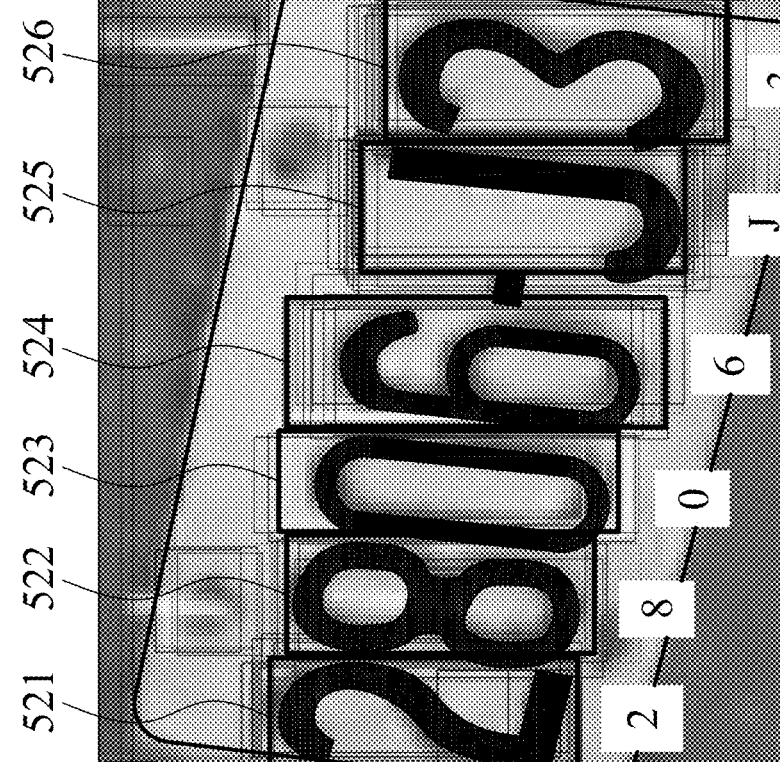

In Step S202, the processing unit 110 receives the to-be-processed image and obtains several feature maps through a feature map extraction module. The feature map extraction module can be trained through matrices for enhancing character features, which is mainly used to highlight characters such as English letters or numbers in the image. FIG. 4A-4D are schematic diagrams showing trained matrices used to generate feature maps according to some embodiments of the invention. In Step S203, after obtaining the feature maps, the processing unit 110 extracts blocks, each of which corresponds to one character, and the corresponding coordinates through a character identification model based on the feature maps. The character identification model is a neural-network-based module, which mainly uses multiple images corresponding to various letters (i.e. A~Z) and numbers (i.e. 0-9) as training data to accurately identify the block and the location of each character in the image. For example, each of the blocks shown in FIG. 5A is a block that is determined to include a character. The character identification model can directly find each of the blocks corresponding to the characters, without the need to divide the characters in the license plate in advance. However, as shown in FIG. 5A, some blocks without any characters are incorrectly determined to include characters, for example, since the image of the surrounding environment resembles a character or since noise occurs in the images. Thus, the processing unit 110 may further select regions with higher reliability (for example, the processing unit 110 selects a region where several blocks overlap) as blocks having characters and obtain the coordinates of the regions at the same time as the basis for the arrangement of the sequence of the characters on the license plate. For example, as shown in FIG. 5B, the regions represented by the thick frame lines are the finally extracted regions with the characters. The erroneous blocks can be effectively filtered by the above manner.

Figure 6:
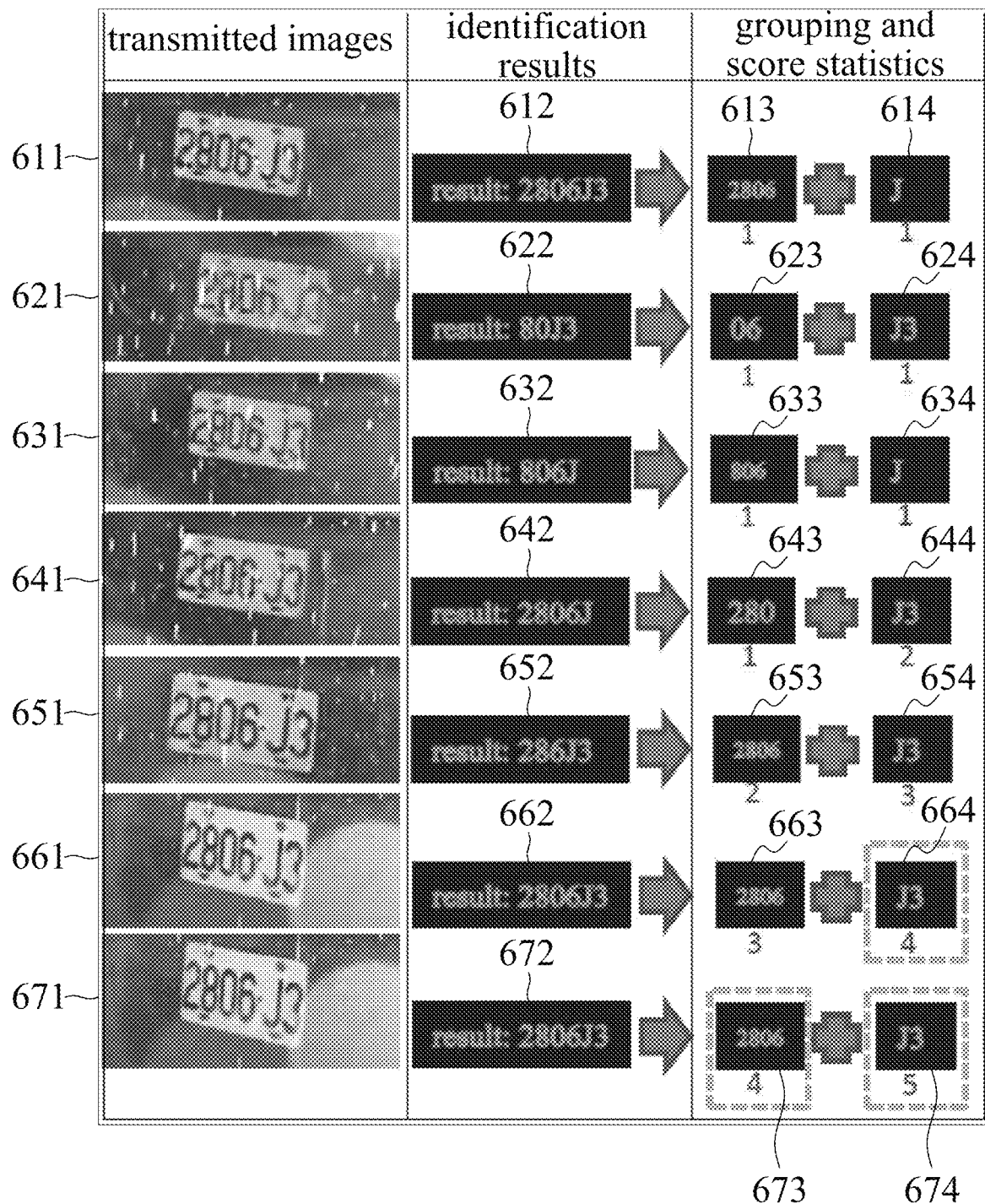
FIG. 6 is a schematic diagram of a voting/statistics module according to an embodiment of the invention.

Then, in Step S204, after obtaining all the characters and the corresponding coordinates of the characters, the processing unit 110 obtains a license plate identification result according to the characters and the sequence of the corresponding coordinates. According to an embodiment of the present invention, the processing unit 110 may further vote for multiple license plate images through a voting/statistics module to improve the accuracy of the license plate identification result. After obtaining all the characters on the license plate and the arrangement sequence of the characters, the processing unit 110 can divide the license plate into at least two groups according to a license plate grouping rule. The license plate grouping rules may include a license plate naming grouping rule, an English character region and number character region grouping rule, a dash grouping rule, a character relative position grouping rule, etc. After the division of the license plate, the processing unit 110 then votes for the identification results of each of the groups. When, for each of the groups, there is one identification result with a voting score that is higher than a threshold, a final license plate identification result is generated. For example, FIG. 6 is a schematic diagram of a voting/statistics module according to an embodiment of the invention. In this embodiment, the processing unit 110 uses the dash grouping rule to divide the license plate into two groups based on the position of the dash (that is, the left half and the right half of the dash). Then, after obtaining the identification results of the two groups, the processing unit 110 votes for the different identification results of each group and accumulates the voting scores if there are duplicate identification results for the same group. For example, as shown in FIG. 6, the first repetition of "2806" appears in the fifth set of identification results, and the voting score of "2806" in the fifth set of identification results is accumulated to 2; the first repetition of "J3" appears in the fourth set of identification results, and the voting score of "J3" in the fourth set of identification results is accumulate to 2; and so on. Assuming that the threshold for the voting scores has been preset to 4, the group on the right half of the dash can be determined as "J3" in the sixth identification result set, and the group on the left half of the dash can be determined as "2806" in the seventh identification result set. Then, the processing unit 110 can output the final license plate identification result as "2806-J3" after completing the seventh set of identification results for the license plate.

According to another embodiment of the present invention, the processing unit 110 may further assign different weights to the identification results according to the time sequence of the identification results. For example, a newer identification result is assigned a larger weight, while an older identification result is assigned a smaller weight, thereby accelerating the convergence speed of the final license plate identification result.

Figure 7A:
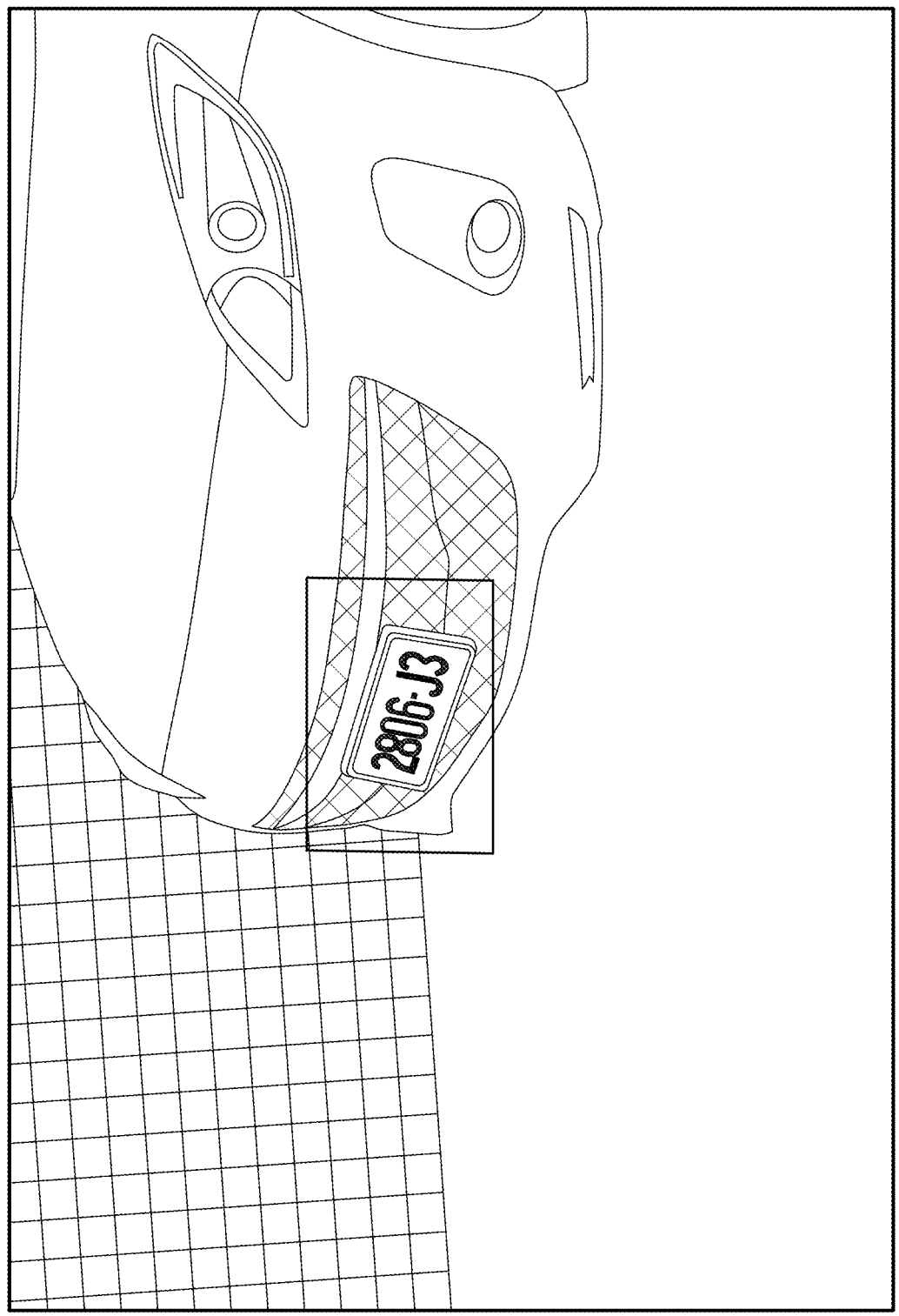
FIG. 7A is a schematic diagram showing a current image according to an embodiment of the invention.
Figure 7B:
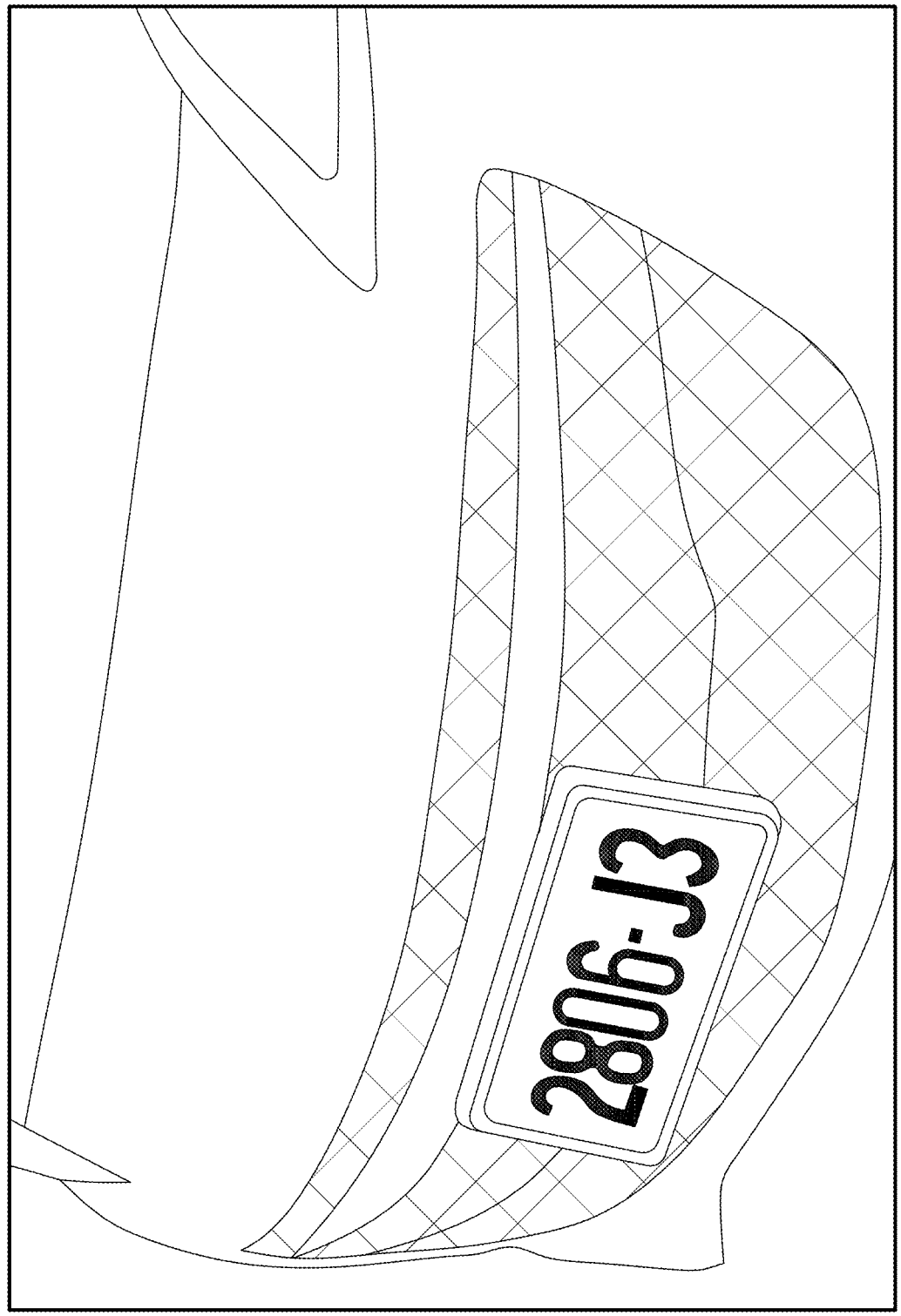
FIG. 7B is a schematic diagram showing a front image of a vehicle according to an embodiment of the present invention.

In addition, according to another embodiment of the present invention, in order to accelerate the processing speed of the processing unit 110 for the information of the license plate, after obtaining a current image including a license plate image, the processing unit 110 may obtain a front image or a rear image from the current image through a vehicle front image capturing module or a vehicle rear image capturing module, thereby reducing the area of the to-be-processed image. The vehicle front image capturing module or the vehicle rear image capturing module uses several image features (such as Haar Feature, HOG, LBP, etc.) with classifiers (cascade classifiers, Ada boost, or SVM) to train various vehicle front images or vehicle rear images, thereby obtaining a front image or a rear image of the vehicle from the current image. For example, FIG. 7A is a schematic diagram showing the current image, and FIG. 7B is a schematic diagram showing the front image of the vehicle which is obtained through the vehicle front image capturing module.

Figure 8:
FIG. 8 is a schematic diagram showing a character region of a license plate according to an embodiment of the invention.

According to another embodiment of the present invention, after obtaining the front image or rear image of the vehicle, in order to further reduce the size of the area of the image which is processed by the processing unit 110, the processing unit 110 may further obtain the region near the license plate from the front image or rear image of the vehicle through a license plate character region detection model. The license plate character region detection model also trains each character image by using several image features (such as Haar Feature, HOG, LBP, etc.) with classifiers (cascade classifiers, Ada boost, or SVM) to find each character from the front image or rear image of the vehicle. For example, as shown in FIG. 8, the processing unit 110 finds four regions 801~804 including characters in the front head image of the vehicle through the license plate character region detection model. Then, the processing unit 110 combines the regions 801~804 to obtain a larger region 810 and expands the region 810 according to the format of the license plate to obtain another region containing all the characters on the license plate. For example, there are six characters on the license plate, and the license plate character region detection model finds only four regions with characters in the front image. Therefore, in order to ensure that the to-be-processed image contains all the characters in the license plate, the processing unit 110 may further determine the magnification of the outward expansion according to the number of found characters. For example, as shown in FIG. 8, the processing unit 110 has found four characters, and, thus, the processing unit 110 expands the region 810 outward from the four sides of the region 810 by two times to obtain another region (that is, the region 820 shown in FIG. 8), which makes sure that all characters are contained in the image to-be-processed. In other words, if the processing unit 110 finds only one region including characters, the processing unit 110 adaptively increases the magnification of the expansion (for example, the processing unit 110 expands the region to the left and right by ten times) to ensure that all characters are contained in the to-be-processed image. The magnification of the expansion can be adjusted according to the user's requirements. The foregoing embodiments are only for illustrative purposes, and the present invention is not limited thereto. Compared with the front image or rear image of the vehicle, the area of the to-be-processed image which is obtained through the license plate character region detection model is accurately reduced, which further increase the speed of the calculation. It is worth noting that, because the main function of the license plate character region detection model is only to find regions in which characters may presented, not to accurately identify characters. Thus, compared to the character identification model, the license plate character region detection model is a weak classifier, that is, its detection accuracy is low but the calculation speed is faster. In addition, the license plate character region detection model and the front image capturing module or rear image capturing module use different image features and classifiers.

In Step S205, in order to further improve the accuracy of the character identification model, the processing unit 110 further uses images and corresponding identification results as training data to update the character identification model. The above-mentioned identification results include correct license plate identification results and incorrect license plate identification results, thereby reducing the identification error of the character identification model and indirectly speeding up the processing speed of the license plate identification system.

Figure 9:
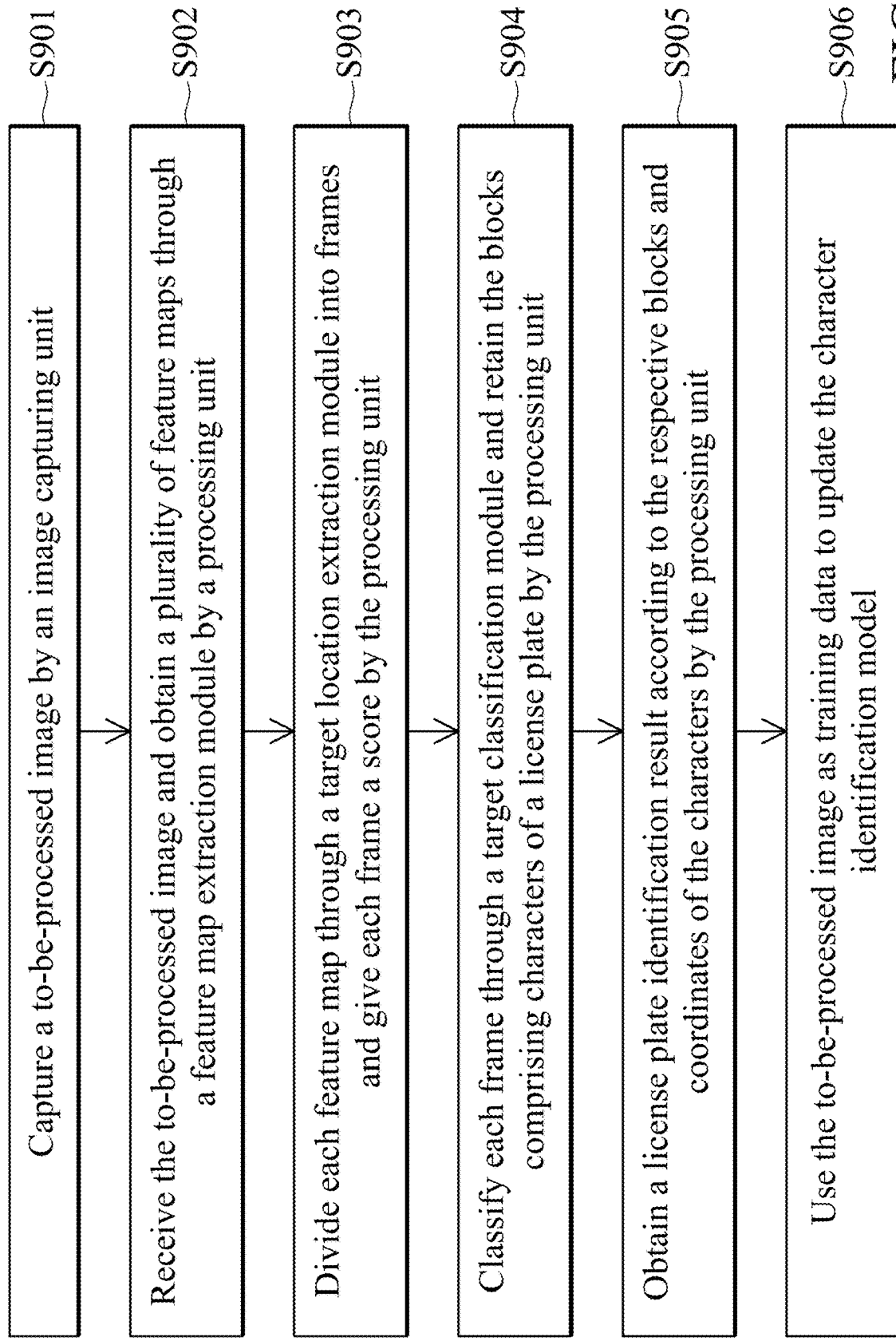
FIG. 9 shows a flowchart of a license plate identification method according to another embodiment of the present invention.

FIG. 9 shows a flowchart of a license plate identification method according to another embodiment of the present invention. In Step S901, the image capturing unit 130 obtains at least one to-be-processed image. In Step S902, the processing unit 110 receives the obtained to-be-processed image from the image capturing unit 130 and obtains several feature maps through a feature map extraction module. The information contained in the feature maps includes several target features corresponding to different spatial frequencies (for example, from a low frequency to a high frequency), and the target features include character features of the license plate, the features of the license plate appearance, background features, and vehicle information features (such as direction mirrors, vehicle models, wheels, etc. which represent the features of the vehicle). In addition, the feature map extraction module can be trained through matrices containing the aforementioned target features. In Step S903, after obtaining the feature maps, the processing unit 110 finds out the regions including the aforementioned target features according to the feature maps through a target location extraction module.

According to an embodiment of the present invention, the processing unit 110 may extract one frame every predetermined number of pixels on the feature map by clustering or a custom size, determine the features that may be contained in each frame according to the feature map extraction module, and give each frame the scores each which corresponds to one target feature. Alternatively, according to another embodiment of the present invention, the processing unit 110 first obtains a target sensitivity score drawing of the feature maps through a simple classifier. In other words, the processing unit 110 finds several target feature points or target feature regions having the target features on the feature maps and circles several regions located near the target feature points by using frames with different sizes, and gives the regions the scores that correspond to the target features.

Next, after the processing unit 110 obtains all the scores that correspond to the target features of each frame, the method proceeds to Step S904. In Step S904, the processing unit 110 retains only the target features whose scores are largest and exceed a predetermined value by means of non-maximum value suppression and through a target candidate classification module. For example, for a certain frame, if the score corresponding to the background feature is the largest, and it is higher than a predetermined value, the processing unit 110 classifies the frame as corresponding to the background feature. In addition, for a certain frame, when all of the scores that correspond to the target features are not higher than the predetermined value, the frame is classified as corresponding to a non-target feature. In addition, the processing unit 110 may further combine adjacent frames with the same target feature into a larger region through a target candidate classification module, so as to facilitate the subsequent identification process. Then, the processing unit 110 only reserves the regions corresponding to the character features, and the method proceeds to Step S905. In step S905, the processing unit 110 obtains a license plate identification result according to the characters and the sequence of the coordinates (for example, from left to right, from top to bottom). As mentioned above, the processing unit 110 can vote on several images of the license plate through the aforementioned voting/statistics module to improve the accuracy of the license plate identification result. The identification of the license plate in Step S905 is similar to that in Step S204 and will not be described here to simplify the description.

Then, in Step S906, the processing unit 110 further uses to-be-processed images and corresponding identification results as training data to update the character identification model. The aforementioned identification results include correct license plate identification results and incorrect license plate identification results, thereby reducing the identification error of the character identification model.

According to the license plate identification method and the license plate identification system proposed in some embodiments of the present invention, the identification speed can be maintained fast in an environment with poor viewing angle or complicated changes through the aforementioned license plate image capturing step and license plate character identification step. Moreover, by continuously using the identification results as training data, the error of the license plate identification can be reduced, and the calculation speed of the license plate identification system can be indirectly sped up.

The features of the embodiments are described above, so that those skilled in the technical field can clearly understand the form of this specification. Those skilled in the art can understand that they can use the disclosure of the present invention as a basis to design or modify other processes and structures to accomplish the same purpose as the above-mentioned embodiment and/or achieve the same advantages as the above-mentioned embodiment. Those skilled in the technical field can also understand that equivalent structures that do not depart from the spirit and scope of the present invention can be arbitrarily changed, substituted and modified without departing from the spirit and scope of the present invention.

The invention claimed is:

1. A license plate identification method, comprising steps of:
   receiving a raw image;
   extracting a historical background image through a foreground and background subtraction module;
   comparing the raw image with the historical background image to determine an amount of image change; and
   determining whether the amount of image change is greater than a predetermined value,
   when the amount of image change is greater than the predetermined value, generating a to-be-processed image comprising all of characters on a license plate;
   extracting a plurality of feature maps comprising character features of the to-be-processed image through a feature map extraction module;
   for each of the characters, extracting a block and a coordinate according to the feature maps through a character identification model based on a neural network; and
   obtaining a license plate identification result according to the respective blocks and the respective coordinates of the characters.

2. The license plate identification method as claimed in claim 1, further comprising steps of:
   obtaining a vehicle front image or a vehicle rear image from the raw image through a vehicle front image capturing module or a vehicle rear image capturing module by using a first image feature and a first classifier; and
   obtaining the to-be-processed image comprising all of the characters according to the vehicle front image or the vehicle rear image through a license plate character region detection model.

3. The license plate identification method as claimed in claim 2, further comprising steps of:
   obtaining at least one character block from the vehicle front image or the vehicle rear image through the license plate character region detection model by using a second image feature and a second classifier; and
   determining a magnification according to the number of character blocks,
   wherein the to-be-processed image is obtained based on the character block according to the magnification.

4. The license plate identification method as claimed in claim 1, further comprising steps of:
   receiving license plate identification results;
   dividing the plurality of license plate identification results into at least two groups according to a license plate grouping rule;
   voting for each sub-identification result in each of the groups;
   when, for each group, there is one sub-identification result having a voting score that is higher than a threshold value, generating a final license plate identification result according to the sub-identification results; and
   updating the character identification model according to the license plate identification result or the final license plate identification result, wherein the license plate grouping rule comprises a license plate naming grouping rule, an English character region and number character region grouping rule, a dash grouping rule, and a character relative position grouping rule.

5. The license plate identification method as claimed in claim 4, further comprising steps of:
assigning a weight to each license plate identification result according to a time sequence of all the license plate identification results; and
when, for each group, a weighted sum of one sub-identification result is greater than the threshold value, generating the final license plate identification result according to the sub-identification results.

6. A license plate identification system, comprising:
an image capturing apparatus configured to capture at least one raw image; and
a processor configured to:
receive the raw image from the image capturing apparatus;
extract a historical background image through a foreground and background subtraction module;
compare the raw image with the historical background image to determine the amount of image change;
determine whether the amount of image change is greater than a predetermined value;
when the amount of image change is greater than the predetermined value, generate a to-be-processed image comprising all of characters on a license plate according to the raw image;
obtain a plurality of feature maps comprising character features of the to-be-processed image through a feature map extraction module;
for each of the characters, extract a block and a coordinate according to the feature maps through a character identification model based on a neural network; and
obtain a license plate identification result according to the respective blocks and the respective coordinates of the characters.

7. The license plate identification system as claimed in claim 6, wherein the processor is further configured to:
obtain a vehicle front image or a vehicle rear image from the raw image through a vehicle front image capturing module or a vehicle rear image capturing module by using a first image feature and a first classifier; and
obtain the to-be-processed image including all of the characters according to the vehicle front image or the vehicle rear image through a license plate character region detection model.

8. The license plate identification system as claimed in claim 7, wherein the processor is further configured to:
obtain at least one character block from the vehicle front image or the vehicle rear image through the license plate character region detection model by using a second image feature and a second classifier; and
determine a magnification according to the number of character blocks,
wherein the to-be-processed image is obtained based on the character block according to the magnification.

9. The license plate identification system as claimed in claim 6, wherein the processor is further configured to:
receive a plurality of license plate identification results;
divide the plurality of license plate identification results into at least two groups according to a license plate grouping rule;
vote for each sub-identification result in each of the groups;
when, for each group, there is one sub-identification result having a voting score that is higher than a threshold value, generate a final license plate identification result according the sub-identification results; and
update the character identification model according to the license plate identification result or the final license plate identification result,
wherein the license plate grouping rule comprises a license plate naming grouping rule, an English character region and number character region grouping rule, a dash grouping rule, and a character relative position grouping rule.

10. The license plate identification system as claimed in claim 9, wherein the processor is further configured to:
assign a weight to each license plate identification result according to a time sequence of all the license plate identification results; and
when, for each group, a weighted sum of one sub-identification result is greater than the threshold value, generate the final license plate identification result according to the sub-identification results.

* * * * *